United States Patent
Hudson et al.

(10) Patent No.: US 10,341,002 B2
(45) Date of Patent: Jul. 2, 2019

(54) APPARATUS AND METHOD FOR COMMUNICATIONS MANAGEMENT

(71) Applicant: BAE SYSTEMS PLC, London (GB)

(72) Inventors: Peter Noble Hudson, Preston (GB); Rania Hamdi Eissa, Preston (GB); Monadl Abd Al-Abbas Mansour Al-Ameri, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/748,748

(22) PCT Filed: Aug. 5, 2016

(86) PCT No.: PCT/GB2016/052400
§ 371 (c)(1),
(2) Date: Jan. 30, 2018

(87) PCT Pub. No.: WO2017/025723
PCT Pub. Date: Feb. 16, 2017

(65) Prior Publication Data
US 2019/0028172 A1    Jan. 24, 2019

(30) Foreign Application Priority Data

Aug. 13, 2015 (GB) .................................. 1514457.9
Sep. 3, 2015 (EP) .................................. 15183720

(51) Int. Cl.
H04B 7/06       (2006.01)
H04B 7/185     (2006.01)
(Continued)

(52) U.S. Cl.
CPC ......... *H04B 7/0634* (2013.01); *H04B 7/0469* (2013.01); *H04B 7/0608* (2013.01); *H04B 7/18504* (2013.01); *H04B 17/336* (2015.01)

(58) Field of Classification Search
CPC .. H04B 7/0634; H04B 7/0608; H04B 7/0469; H04B 7/18504; H04B 17/336
See application file for complete search history.

(56) References Cited

U.S. PATENT DOCUMENTS 2,062,003 A   11/1936   Hammond, Jr.
4,100,472 A   7/1978    Mobley
(Continued)

FOREIGN PATENT DOCUMENTS

EP   0481171 A2   4/1992
EP   0532383 A1   3/1993
(Continued)

OTHER PUBLICATIONS

International Preliminary Report on Patentability of International Application No. PCT/GB2016/052379, dated Feb. 22, 2018, 7 pages.
(Continued)

*Primary Examiner* — Siu M Lee
(74) *Attorney, Agent, or Firm* — Maine Cernota & Rardin

(57) ABSTRACT

Apparatus for management of communications resources of a moving platform comprising a communications system configured to effect wireless data communication between the moving platform and a recipient node, the communications resources comprising a plurality of wireless communications links for facilitating the wireless data communication and a plurality of antennas associated therewith, the apparatus comprising an antenna analysis and selection module residing with the communications system and configured to:
identify a communications requirement between the moving platform and a recipient node;
receive attribute data representative of movement of the platform, the attribute data including platform movement data comprising future known movement of the
(Continued)

moving platform and/or future predicted movement of the moving platform and/or the recipient node;

determine, using the attribute data, suitability of each of a plurality of antennas and/or portions of aperture antenna for data transmission from the moving platform to the recipient node;

determine a quality metric for each of a plurality of antennas/portions of aperture antenna, the quality metric being indicative of a respective performance criterion; and select one or more of the suitable antennas/portion of aperture antenna having a highest performance criterion, for the data transmission.

15 Claims, 8 Drawing Sheets

(51) Int. Cl.
*H04B 17/336* (2015.01)
*H04B 7/0456* (2017.01)

(56) References Cited

U.S. PATENT DOCUMENTS

| | | | |
|---|---|---|---|
| 6,026,097 | A | 2/2000 | Voois |
| 6,115,580 | A | 9/2000 | Chuprun et al. |
| 7,072,977 | B1 | 7/2006 | Bernard et al. |
| 7,151,749 | B2 | 12/2006 | Vega-Garcia |
| 8,005,418 | B2 * | 8/2011 | Walker ............... H04B 7/18519 455/3.01 |
| 8,554,264 | B1 | 10/2013 | Gibbons et al. |
| 2002/0142773 | A1 | 10/2002 | Rudrapatna et al. |
| 2002/0164981 | A1 | 11/2002 | Parkman |
| 2003/0073406 | A1 | 4/2003 | Benjamin |
| 2003/0114195 | A1 | 6/2003 | Chitrapu |
| 2005/0202827 | A1 | 9/2005 | DeMarco et al. |
| 2006/0030350 | A1 | 2/2006 | Mitchell |
| 2006/0168592 | A1 | 7/2006 | Andrews et al. |
| 2007/0064604 | A1 | 3/2007 | Chen |
| 2007/0168090 | A1 | 7/2007 | DeMarco et al. |
| 2007/0258445 | A1 | 11/2007 | Smith |
| 2007/0258486 | A1 | 11/2007 | Smith |
| 2007/0291647 | A1 | 12/2007 | Smith |
| 2007/0291767 | A1 | 12/2007 | Smith |
| 2007/0291768 | A1 | 12/2007 | Galluscio |
| 2007/0291780 | A1 | 12/2007 | Smith |
| 2007/0297416 | A1 | 12/2007 | Boley |
| 2008/0026767 | A1 | 1/2008 | Krstulich |
| 2008/0204279 | A1 | 8/2008 | Bourgault |
| 2009/0079631 | A1 | 3/2009 | Hurst |
| 2009/0185617 | A1 | 7/2009 | Houghton et al. |
| 2009/0326735 | A1 | 12/2009 | Wood |
| 2010/0057278 | A1 | 3/2010 | Lee |
| 2010/0094485 | A1 | 4/2010 | Verlut et al. |
| 2010/0220648 | A1 | 9/2010 | Persson |
| 2010/0278086 | A1 | 11/2010 | Pochitaju |
| 2010/0323715 | A1 | 12/2010 | Winters |
| 2011/0090835 | A1 | 4/2011 | Furukawa |
| 2011/0255506 | A1 | 10/2011 | Toth |
| 2012/0078453 | A1 | 3/2012 | Daum et al. |
| 2012/0257657 | A1 | 10/2012 | Subrahmanya et al. |
| 2012/0268319 | A1 | 10/2012 | Mitchell |
| 2013/0041529 | A1 | 2/2013 | He |
| 2013/0095822 | A1 | 4/2013 | Swardh |
| 2013/0324070 | A1 * | 12/2013 | Bennett ............... H04W 84/005 455/404.1 |
| 2014/0014787 | A1 | 1/2014 | Chen |
| 2014/0075506 | A1 | 3/2014 | Davis |
| 2014/0105054 | A1 | 4/2014 | Saegrov et al. |
| 2014/0142787 | A1 | 5/2014 | Tillotson et al. |
| 2014/0218239 | A1 | 8/2014 | Sharawi et al. |
| 2014/0226584 | A1 | 8/2014 | Cullen et al. |
| 2014/0274180 | A1 | 9/2014 | DuBois |
| 2014/0323038 | A1 | 10/2014 | Hubbell et al. |
| 2015/0043337 | A1 | 2/2015 | Kanamarlapudi |
| 2015/0102953 | A1 * | 4/2015 | Stayton ............... G01S 13/785 342/47 |
| 2015/0120087 | A1 | 4/2015 | Duan |
| 2015/0131513 | A1 | 5/2015 | Lauer |
| 2015/0210387 | A1 | 7/2015 | Ling |
| 2015/0229376 | A1 * | 8/2015 | Kikuchi ............... H01Q 3/24 342/367 |
| 2017/0034277 | A1 | 2/2017 | Jackson |
| 2017/0283038 | A1 | 10/2017 | Lin |

FOREIGN PATENT DOCUMENTS

| | | |
|---|---|---|
| EP | 1519507 A2 | 3/2005 |
| EP | 1630978 A2 | 3/2006 |
| EP | 2228868 A1 | 9/2010 |
| EP | 2378676 A1 | 10/2011 |
| EP | 2450862 A1 | 5/2012 |
| EP | 2469291 A1 | 6/2012 |
| EP | 2779480 A2 | 9/2014 |
| EP | 2822187 A1 | 1/2015 |
| EP | 2869479 A1 | 5/2015 |
| EP | 2933931 A2 | 10/2015 |
| GB | 2493779 A | 2/2013 |
| JP | 2001153596 A | 6/2001 |
| JP | 2010171496 A | 8/2010 |
| TW | 201321916 A | 6/2013 |
| WO | 2006130272 A2 | 12/2006 |
| WO | 2007021411 A2 | 2/2007 |
| WO | 2007110607 A1 | 10/2007 |
| WO | 2010147986 A1 | 12/2010 |
| WO | 2011075869 A1 | 6/2011 |
| WO | 2012145570 A1 | 10/2012 |
| WO | 2015117284 A1 | 8/2015 |

OTHER PUBLICATIONS

International Preliminary Report on Patentability of International Application No. PCT/GB2016/052371, dated Feb. 22, 2018, 10 pages.
International Preliminary Report on Patentability of International Application No. PCT/GB2016/052374, dated Feb. 22, 2018, 8 pages.
International Preliminary Report on Patentability of International Application No. PCT/GB2016/052484, dated Feb. 22, 2018, 7 pages.
International Preliminary Report on Patentability of International Application No. PCT/GB2016/052480, dated Feb. 22, 2018, 8 pages.
International Preliminary Report on Patentability of International Application No. PCT/GB2016/052481, dated Feb. 22, 2018, 8 pages.
International Preliminary Report on Patentability of International Application No. PCT/GB2016/052401, dated Feb. 22, 2018, 8 pages.
International Preliminary Report on Patentability of International Application No. PCT/GB2016/052400, dated Feb. 22, 2018, 7 pages.
International Preliminary Report on Patentability of International Application No. PCT/GB2016/052378, dated Feb. 22, 2018, 7 pages.
International Preliminary Report on Patentability of International Application No. PCT/GB2016/052483, dated Feb. 22, 2018, 9 pages.
International Search Report and Written Opinion of International Application No. PCT/GB2016/052371, dated Oct. 26, 2016, 14 pages.
Great Britain Search Report under Section 17 of Great Britain Application No. GB1514451.2, dated Feb. 15, 2016, 3 pages.
Extended European Search Report of European Application No. EP15183514, dated Mar. 2, 2016, 10 pages.

(56) References Cited

OTHER PUBLICATIONS

International Search Report and Written Opinion of International Application No. PCT/GB2016/052374, dated Oct. 13, 2016, 12 pages.
Great Britain Search Report under Section 17 of Great Britain Application No. GB1514452, dated Jan. 26, 2016, 4 pages.
Extended European Search Report of European Application No. EP15183519, dated Mar. 3, 2016, 8 pages.
International Search Report and Written Opinion of International Application No. PCT/GB2016/052378 dated Oct. 24, 2016, 11 pages.
Great Britain Search Report under Section 17 of Great Britain Application No. GB1514454.6, dated Jan. 28, 2016, 3 pages.
European Search Report of European Application No. EP15183517, dated Mar. 1, 2016, 8 pages.
International Search Report and Written Opinion of International Application No. PCT/GB2016/052379, dated Oct. 18, 2016, 10 pages.
Great Britain Search Report under Section 17 of Great Britain Application No. GB1514455.3, dated Mar. 18, 2016, 4 pages.
European Search Report of European Application No. EP15183723, dated Mar. 3, 2016, 6 pages.
International Search Report and Written Opinion of International Application No. PCT/GB2016/052400, dated Oct. 18, 2016, 12 pages.
Great Britain Search Report under Section 17 of Great Britain Application No. GB1514457.9, dated Mar. 18, 2016, 3 page.
European Search Report of European Application No. EP15183720, dated Mar. 4, 2016, 8 pages.
Chen-Mou Cheng et al: "Transmit Antenna Selection Based on Link-layer Channel Probing", World of Wireless, Mobile and Multimedia Networks, 2007. WOWMUM 2007. IEEE International Symposium on A, IEEE, PI, Jun. 1, 2001, pp. 1-6 XP031149144.
International Search Report and Written Opinion of International Application No. PCT/GB2016/052401, dated Oct. 14, 2016, 12 pages.
Great Britain Search Report under Section 17 of Great Britain Application No. GB1514459.5, dated Jan. 28, 2016, 4 pages.
European Search Report of European Application No. EP15183731, dated Mar. 9, 2016, 8 pages.
International Search Report and Written Opinion of International Application No. PCT/GB2016/052481, dated Nov. 2, 2016, 12 pages.
Great Britain Search Report under Section 17 of Great Britain Application No. GB1514460.3, dated Jan. 27, 2016, 3 pages.
Great Britain Search Report under Section 17 of Great Britain Application No. GB1613746.5, dated Jan. 30, 2017, 5 pages.
European Search Report of European Application No. EP15184038, dated Mar. 2, 2016, 9 pages.
International Search Report and Written Opinion of International Application No. PCT/GB2016/052483, dated Oct. 28, 2016, 13 pages.
Great Britain Search Report under Section 17 of Great Britain Application No. GB1514461.1, dated Jan. 29, 2016, 3 pages.
Great Britain Search Report under Section 17 of Great Britain Application No. GB1613747.3, dated Jan. 6, 2017, 5 pages.
European Search Report of European Application No. EP15184043, dated Mar. 7, 2016, 10 pages.
International Search Report and Written Opinion of International Application No. PCT/GB2016/052480, dated Oct. 28, 2016, 12 pages.
Great Britain Search Report under Section 17 of Great Britain Application No. GB1514462.9, dated Mar. 18, 2016, 3 pages.
European Search Report of European Application No. EP15184044, dated Mar. 10, 2016, 8 pages.
International Search Report and Written Opinion of International Application No. PCT/GB2016/052484, dated Oct. 18, 2016, 12 pages.
Great Britain Search Report under Section 17 of Great Britain Application No. GB1514465.2, dated Mar. 17, 2016, 3 pages.
European Search Report of European Application No. EP15184074, dated Mar. 4, 2016, 8 pages.

* cited by examiner

APPARATUS AND METHOD FOR COMMUNICATIONS MANAGEMENT

RELATED APPLICATIONS

This application is a National Phase application filed under 35 USC § 371 of PCT Application No. PCT/GB2016/052400 with an International filing date of Aug. 5, 2016, which claims priority of GB Patent Application GB1514457.9 filed Aug. 13, 2015 and EP Patent Application EP15183720.0 filed Sep. 3, 2015. Each of these applications is herein incorporated by reference in their entirety for all purposes.

FIELD OF THE INVENTION

This invention relates generally to an apparatus and method for communications and information management and, more particularly, but not necessarily exclusively, to an apparatus and method for management of wireless communications resources between a moving platform and at least one remote recipient.

BACKGROUND

There are many applications in which it is required to apply a level of management in respect of wireless communications resources and the management of information, particularly between a moving platform and one or more remote platform(s), and maintain adequate wireless communications therebetween for safe operation of the moving platform and mission success.

For example, in the case of aerial vehicles and, more particularly, unmanned aerial vehicles (UAVs), there is an ongoing and stringent requirement to maintain an adequate communications link between the aerial vehicle and a ground station, for example, and unexpected loss or degradation of such a communication link can be catastrophic.

A UAS is composed of three main parts, the unmanned air vehicle (UAV), unmanned control station (UCS) and support systems of the UAS (for pre-mission planning). A UAS Mission System may be composed of the following functional components/subsystems: Mission Management, Communications, Vehicle Health, Navigation System, Airspace Integration, Payload and Power Management. Multiple, different dynamic in-mission planners may reside in one or more of the above-mentioned functional components/subsystems. In a typical UAV, a dynamic route planner generates a new route, in real time, when there is a change in the operational environment, e.g. severe weather, threat, or a change of circumstances, e.g. an emergency, or a dynamic manoeuvre plan is generated to avoid an airborne obstacle. The aim is thus to maintain safety and the survivability of the aircraft by determining a feasible route and/or manoeuvre in real time, while avoiding pop-up, static and dynamic obstacles, for example.

However, the operational environment of moving platforms, at least in some applications, can be particularly challenging from a communications perspective. The antennas are normally securely mounted to an aircraft and are not movable relative to the aircraft. An antenna on the aircraft used for transmitting messages will not always be optimally oriented with respect to the recipient as the aircraft manoeuvres. The signal is lost or adversely affected by aircraft orientation, which cause the antenna on the aircraft to be pointed in an unfavourable direction or the path between the transmitting antenna on the aircraft and recipient to be blocked by the aircraft structure (e.g. wing). Thus, a particular on-board antenna may not always be optimally oriented to establish or maintain an adequate communications with an antenna on another node, as the aircraft manoeuvres.

An on-board antenna for transmitting messages may be oriented in an unfavourable direction relative to an imposed emissions control (EMCON) region or with respect to an adversary. Also, the energy radiated in that direction may exceed an acceptable threshold for emissions control, increasing the vulnerability of the node and possibly betraying its existence. Traditionally a platform is required to operate in silence, in order to avoid being overheard. If the communications system was able to adapt and respond accordingly, for example by using an alternate antenna, it may still be possible to maintain communications whilst adhering to EMCON.

CHEN-MOU CHENG ET AL, "Transmit Antenna Selection Based on Link-layer Channel Probing", World of Wireless, Mobile and Multimedia Networks, 2007, IEEE 2007 describes a method of transmit antenna selection for a moving platform by periodically transmitting a probe packet from alternating antennas to the recipient node. The recipient node is configured to receive the probe packets and send back, to the transmitting node, data representative of the received signals strengths so that the transmitting node can select the best antenna for ongoing transmissions. However, this process requires the cooperation (and correct configuration) of the recipient node. The transmitting node (i.e. the moving platform) cannot perform the antenna selection autonomously or, indeed, dynamically based only on the data it wants to send and the recipient node it wishes to transmit to.

It would therefore be desirable to provide an intelligent communications management system for a moving platform that is able to adapt and respond dynamically to an uncertain dynamic battlefield environment, such as threats, by managing their communications resources accordingly.

SUMMARY

In accordance with an aspect of the present invention, there is provided apparatus for management of communications resources of a moving platform comprising a communications system configured to effect wireless data communication between said moving platform and a recipient node, said communications resources comprising a plurality of wireless communications links for facilitating said wireless data communication and a plurality of antennas associated therewith, the apparatus comprising an antenna analysis and selection module residing with said communications system and configured to:
  identify a communications requirement between said moving platform and a recipient node;
  receive attribute data representative of movement of said platform, said attribute data including platform movement data comprising future known movement of said moving platform and/or future predicted movement of said moving platform and/or said recipient node;
  determine, using said attribute data, suitability of each of a plurality of antennas and/or portions of aperture antenna for data transmission from said moving platform to said recipient node;
  if a plurality of antennas/portions of aperture antenna are determined to be suitable for data transmission to said recipient node, determine a quality metric for each of said plurality of antennas/portions of aperture antenna, said quality metric being indicative of a respective performance criterion; and select one or more of said suitable antennas/portion of aperture antenna having a highest performance criterion, for said data transmission.

In an exemplary embodiment, the apparatus may be configured to determine, by estimating a quality if a respective resultant communications link, said suitability of each of a plurality of antennas and/or portions of aperture antenna for data transmission from said moving platform to said recipient node.

The attribute data may include data representative of emissions control criteria associated with said moving platform and/or said recipient node. In this case, the apparatus may be configured to determine said suitability of each of a plurality of antennas and/or portions of aperture antenna for data transmission from said moving platform to said recipient node by determining, for each said antenna/portion of antenna aperture, whether or not data transmission thereby to said recipient node will adhere to said emissions control criteria.

The apparatus may be configured to receive, during mission execution, platform movement data and/or attribute data representative of emissions control restrictions from a system/subsystem and/or function of said moving platform. In this case, said platform movement data may comprise position and/or attitude data associated with said moving platform and received from one or more systems/subsystems and/or functions of said moving platform. The attribute data may include route and/or manoeuvre and/or trajectory data.

In an exemplary embodiment, the quality metric may be representative of antenna gain characteristic of a respective antenna, based on moving platform position and/or attitude.

Optionally, the apparatus is configured to receive, during a mission from one or more systems/subsystems and/or functions of said moving platform, attribute data representative of said emissions control criteria, said attribute data comprising (i) location data representative of a specified emissions control region, and/or (ii) position and/or attitude and/or velocity data representative of an adversary node defining an emissions control region.

In some exemplary embodiments, the attribute data may include data representative of current movement of said moving platform.

The apparatus may be configured to obtain (i) data representative of a location of a fixed recipient node with respect to said moving platform, or (ii) data representative of position and/or attitude and/or velocity of a mobile recipient node with respect to said moving platform; and to:

determine a direction of said moving platform relative to said fixed/mobile recipient node;

determine an antenna pointing loss of each said antenna/aperture portion antenna at said recipient node and/or said moving platform; and calculate a quality metric for each said antenna/portions of aperture antennas based on said pointing loss(es) or a performance metric based on said pointing loss.

In this case, the antenna pointing loss may be determined based on data representative of position, attitude, antenna location, antenna pointing, and antenna gain pattern for said recipient node and/or said moving platform; and, optionally, the position data comprises a vector based on location or position data relating to said moving platform and said fixed or mobile node. The performance metric for a specified antenna or aperture portion antenna may be determined by estimating a signal power value thereof. A signal power value in respect of a communications link for an antenna or portion of aperture antenna may be based on relative distance between the moving platform and the recipient node, antenna pointing loss(es), other loss factors, transmitting antenna gain and receiving antenna gain. The above-mentioned performance metric for a specified antenna or portion of aperture antenna may be based on signal power and a communications requirement of the moving platform.

The quality metric may be indicative of antenna availability and/or preference and/or compatibility.

In an exemplary embodiment, the apparatus may be configured to calculate said quality metric based on calculations of orientation between said moving platform and said recipient node. In this case, the calculations of orientation may include one or more of historical orientation calculation, current orientation calculation, predicted future orientation calculation, and a priori known future orientation calculation.

The apparatus may be configured to identify one or more suitable antennas or aperture portion antennas from a plurality of antenna resources by (i) determining a location or position of an emissions control region; (ii) determining orientation of said moving platform relative to an emissions control region; (iii) obtaining modified antenna pointing data in respect of a specified antenna or aperture portion antenna; (iv) determining if wireless data transmission via said antenna or aperture portion antenna will violate said emissions control region; and (v) calculating a quality metric for each said antenna or portion of aperture antenna of said moving platform relative to an emissions control region. In this case, modified antenna pointing data may be determined using data representative of antenna mount and pointing, platform attitude and/or position. Optionally, the apparatus may be configured to determine if wireless data transmission via said antenna or aperture portion antenna will violate said emissions control region by (i) determining whether said antenna/aperture portion antenna is pointing in the direction of said emissions control region, based on said modified antenna pointing data, orientation of said moving platform relative to said emissions control region, antenna/aperture portion antenna gain and receiver antenna gain in respect of said recipient node within said emissions control region; and (ii) determining whether or not the signal power of said antenna/aperture portion antenna exceeds a signal power threshold with respect to said emissions control region; and, optionally, signal power of a communications link for an antenna/aperture portion antenna may be based on a relative distance between said moving platform and said emissions control region. The above-mentioned relative distance may be a function of time, velocity of said moving platform and/or an adversary node, loss factors, transmitting antenna gain and receiving antenna gain. The relative distance may be a function of time and velocity of said moving platform and/or adversary node. The apparatus may be configured to determine a signal power metric based on the signal power value and a signal power threshold for each said antenna or portion of aperture antenna.

In accordance with another aspect of the present invention, there is provided a management system for a moving platform, the management system comprising a communications system configured to effect wireless data communication between said moving platform and a recipient node by means of one or more of a plurality of supported communications links for having a plurality of antennas associated therewith, and apparatus substantially as described above.

In accordance with yet another aspect of the present invention, there is provided a method for management of communications resources of a moving platform comprising a communications system configured to effect wireless data communication between said moving platform and a recipient node, said communications resources comprising a plurality of wireless communications links for facilitating said wireless data communication and a plurality of antennas associated therewith, the method comprising using an antenna analysis and selection module residing with said communications system to:

identify a communications requirement between said moving platform and a recipient node;
receive attribute data representative of movement of said platform, said attribute data including platform movement data comprising future known movement of said moving platform and/or future predicted movement of said moving platform and/or said recipient node;
determine, using said attribute data, suitability of each of a plurality of antennas and/or portions of aperture antenna for data transmission from said moving platform to said recipient node;
determine a quality metric for each of a plurality of antennas/portions of aperture antenna, said quality metric being indicative of a respective performance criterion; and
select one or more of said suitable antennas/portion of aperture antenna having a highest performance criterion, for said data transmission.

BRIEF DESCRIPTION OF THE FIGURES

These and other aspects of the present invention will be apparent from the following specific description, in which embodiments of the present invention are described, by way of examples only, and with reference to the accompanying drawings, in which.

DETAILED DESCRIPTION

Figure 1:
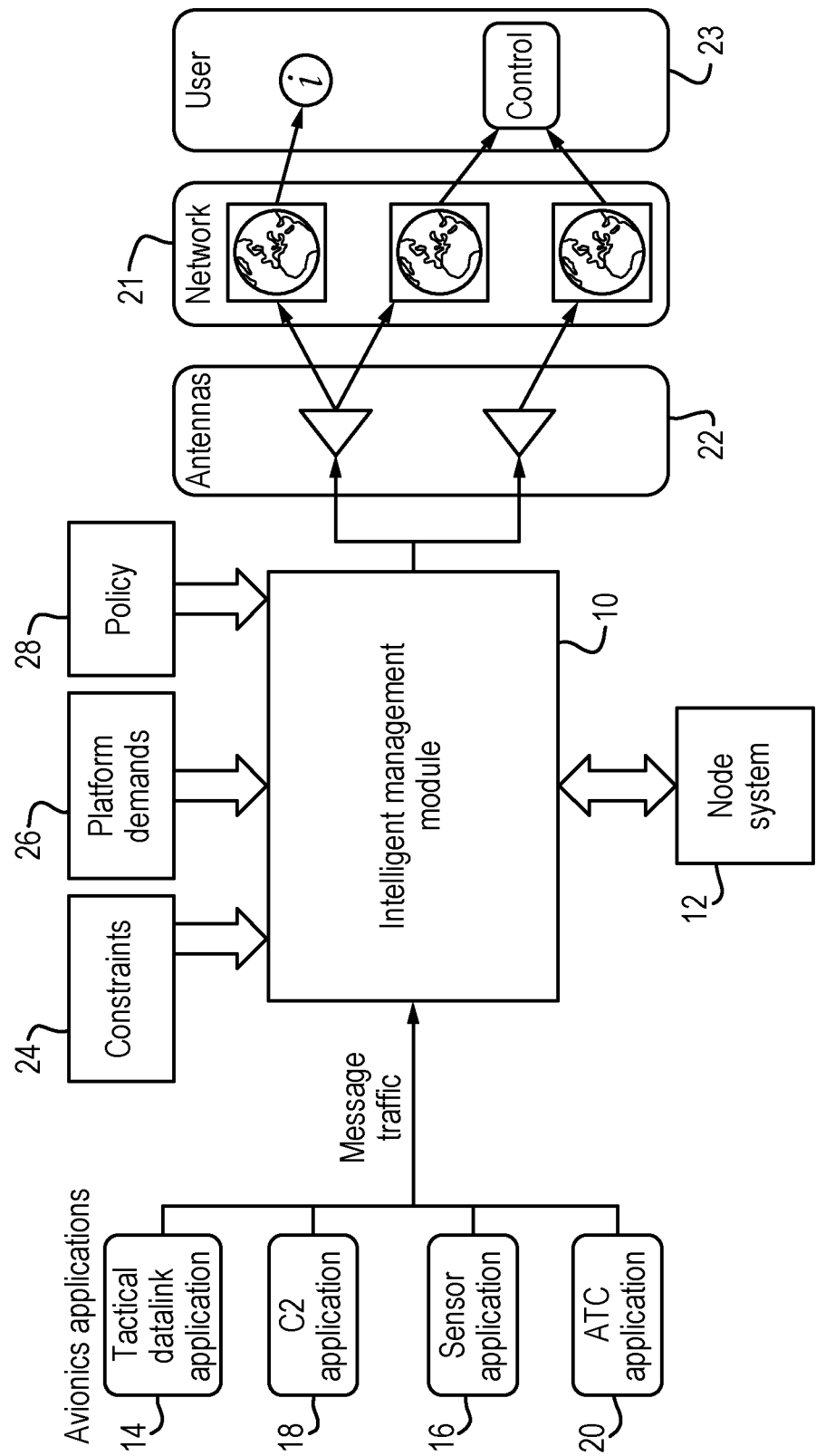
FIG. 1 is a schematic block diagram illustrating a moving platform management system, including apparatus according to an exemplary embodiment of the present invention.

Antenna selection, in accordance with exemplary embodiments of the present invention, considers node motion to determine the best antenna for optimal communications prevailing situational and/or environmental constraints and without violating prevailing emissions control criteria. It will be apparent to a person skilled in the art that antennas are normally securely mounted to an aircraft, or other moving platform, and are not moveable relative thereto. An antenna on a platform used for transmitting messages will not always be optimally oriented with respect to the recipient as the platform manoeuvres. The signal may be lost or adversely affected by platform orientation during, for example in the case of an aircraft, banking manoeuvres or a change in heading, which cause the aircraft antenna to be pointed in an unfavourable direction or the path between the antenna and recipient to be blocked by the aircraft structure (e.g. wing). Using antenna selection, in accordance with exemplary embodiments of the present invention, an alternate antenna may be selected that could otherwise result in a loss of communications. In addition, antenna selection in accordance with exemplary embodiments of the present invention also considers emission control (EMCON) criteria to determine the best antenna for optimal communications without violating EMCON. During restricted emissions control, it may be desirable to maintain contact with a fixed or mobile node while operating, without betraying its existence. An antenna on the platform used for transmitting messages may be pointed in an unfavourable direction with respect to an imposed EMCON region or with respect to an adversary. Furthermore, the energy radiated in that direction may exceed an acceptable threshold for emissions control, thus increasing the vulnerability of the node and exposing its existence. With antenna selection according to exemplary embodiments of the present invention, an alternate antenna is selected to maintain communications whilst adhering to emissions control.

Exemplary embodiments of the present invention provide an intelligent communications management system configured to maintain adequate connectivity throughout a mission, dynamically responding to unplanned events, e.g. any unexpected degradation or loss of a wireless data link in real (or near real) time, as well as emission control strategies and policies.

Traditionally, all aspects of communications, such as multiple, different communications links/radios, reside within the communications system (of an aircraft for example). Each of the communications links/radios is an independent system and usually dedicated to transmitting specific messages. If, for example, an unexpected event occurs, such as a link failure or degradation, change in mission priorities and new operational constraints, the system is unable to adapt and respond accordingly to maintain adequate communications. The communications system is usually a dedicated system without much interaction, if not at all, with other platform systems and avionics applications on the platform. Furthermore, in some cases, a higher-level planner is required, which resides outside the communications system, to meet the changing demands of the platform and new operational constraints.

In contrast, in aspects of the present invention, it is recognised that all functions/systems on a platform (e.g. mission management, communications health management) work in concert to achieve objectives and to maintain integrity of the platform. For example, health monitoring can be used to ensure that communications failure will not lead to catastrophe. Thus, and as will be described in more detail later, the communications system is concerned with low-level decision making, i.e. day-to-day running and decisions. In one exemplary embodiment, the communications management system manages a plurality of communications resources, namely its on-board antennas in aspects of the present invention, for an air vehicle. Based on a list or look-up table of available and/or preferred antennas, it determines the best antenna to use from a plurality of antennas in order to maintain connectivity. However, in aspects of the present invention, if it is unable to resolve a communications issue, for example, all available links to it have failed or severely degraded links, then higher-level planning is invoked via apparatus according to exemplary embodiments of the present invention. In this case, the communications interface may be configured to request that the dynamic planning and management system generate a modified plan to maintain adequate communications. For example, in aspects of the present invention, the higher-level planner selects to use a sensor system's (e.g. RADAR) antenna. In another example, the higher-level planner selects to use an antenna and manoeuvre the platform to optimise communications. In other exemplary embodiments, higher-level planning is invoked in response to receiving information from other parts of the platform, if an adversary is detected for example, in order to generate a communications plan accordingly.

In one exemplary embodiment, apparatus according to the invention may operate in the communications management system, to perform antenna selection and transmit data representative of the selected antenna(s) directly to an antenna controller, for example, to establish communications. In other exemplary embodiments, however, apparatus according to the invention may operate outside of the communications system within a dynamic planning and management system, to perform antenna selection and transmit data representative of the selected antenna(s) directly to the communications system/radio to establish communications. In yet other exemplary embodiments, both the aforementioned implementations may co-exist within a single platform.

Thus, in one embodiment, it is envisaged that the aircraft's future flight trajectory and/or route and/or manoeuvre is provided to the dynamic planning and management system to assess the impact of the trajectory and/or route and/or manoeuvre plan on the communications plan and select antennas for use therein, to maintain adequate communications. In another embodiment, it is envisaged that the communications system, coupled with apparatus according to an exemplary embodiment of the present invention, uses instant knowledge regarding the aircraft's current manoeuvre (e.g. heading or banking), or indeed current knowledge of any other situational/environmental condition affecting a current communications link, to select one or more appropriate antennas in order to maintain adequate communications.

In another exemplary embodiment, an antenna selection module may reside within higher-planning, for example: to plan the use of a sensor system's antenna for communications, which can only be done at a higher-level; to generate a communications plan based on received future platform manoeuvre; and to generate a communications plan as part of platform protection when operating under EMCON.

However, it will be appreciated, that the present invention is in no way intended to be limited as to the location within the overall platform system of the antenna selection module provided by exemplary embodiments of the present invention. For example, an antenna selection module could be provided as part of a higher-level planning element and/or within a message routeing function.

It will be appreciated by a person skilled in the art that the proposed antenna analysis and/or antenna selection may be employed equally effectively:

during an initial planning phase, i.e. pre-mission planning, wherein the antenna analysis function may be used during the route and/or communications planning phase;

during mission execution, when dynamic communications planning (higher-level planning) is performed, in relation to imposed EMCON and/or platform movement, whereby platform movement can be based on: (i) a priori known future platform manoeuvre and/or route and/or trajectory based on data representative thereof (e.g. attitude) received from the dynamic planner or human planner, and (ii) predicted future platform manoeuvre and/or trajectory and/or route; or during mission execution, when the communications management system (lower-level planning) is required to be performed in real (or near real) time, without warning, as a result of a platform movement, based on data representative of a platform movement, for example instantaneous manoeuvre data (e.g. current attitude), received from one or more platform systems.

The operational environment can comprise a plurality of nodes, in the air and on the ground (e.g. airborne platform, mobile and/or fixed control station). These nodes interact with each other over line-of-sight (LOS) or via relay(s), cooperatively working together sharing information, responsibilities and tasks, and exchanging command and control data. In general, a node has multiple data links/radios to enable it to interact with other nodes via different networks, as required.

In the following description of the drawings, a communications management apparatus according to an exemplary embodiment of the invention will be described in relation to a UAV. However, it is to be understood that the present invention is not necessarily intended to be limited in this regard and, indeed, finds application in many other types of moving platform management systems in which it is required to manage communications in an intelligent manner and, for the avoidance of doubt, this would include road and sea-going vehicles, as well as manned aerial vehicles.

Referring to FIG. 1 of the drawings, an intelligent management module 10, including an intelligent communications management interface according to an exemplary embodiment of an aspect of the present invention, is illustrated schematically at the centre of a typical UAV system. The UAV comprises several functional components/subsystems, including communications, navigation system, prognostics and health, etc. Thus, in the schematic diagram of FIG. 1, the intelligent communications management module 10 is depicted as being communicably coupled to other parts 12 of the vehicle. It can be seen from the diagram that two-way data communication is provided between the other parts 12 of the vehicle and the intelligent management module 10. The other parts 12 of the vehicle may comprise a plurality of functional components, possibly including, but not necessarily limited to, a prognostics and health functional component, a navigation system, a control authority, e.g. pilot or on-board authority with executive decision functionality, a utilities management functional component, defensive aids functional component, data transfer and recording functional component, and an HMI (Human Machine Interface) functional component. Any and all of these functional components are configured to provide data, such as navigation data and detected threat, to the intelligent communications management module 10 for use in its decision making.

The intelligent management module 10 is also configured to receive data from a plurality of avionics applications. Such avionics applications may, for example, comprise civil and/or military applications, such as tactical datalink applications 14, sensor applications 16 (e.g. video, images, etc), mission management applications 18 (for example, command and control data), and platform management applications 20 (e.g. health of node). It will be appreciated that this is not a comprehensive list of typical or possible applications from which the intelligent communications management system may receive data and others will be apparent to a person skilled in the art, depending upon the specific application within which the present invention is to be employed.

The intelligent management module 10 is configured to manage multiple communications links (generally depicted in FIG. 1 as 'network' 21), which may include (but are not limited to) tactical data links, satellite links, free space optical links and other data links, as will be apparent to a person skilled in the art, and it may have different antenna types (depicted generally at 22) to manage including, but not limited to, omni-directional and directional antennas, shared aperture antennas, fixed or beam-steerable antennas. The antennas may be shared between communications links/radios, or with sensor systems. In the example illustrated in FIG. 1, the communications from the platform antennas 22 are directed at an end user 23, for example, the remote pilot of a UAV located at a ground station. However, communications are not intended to be limited in this regard, and the type and receiver of communications managed by exemplary embodiments of the present invention may vary greatly, depending on application, system configuration and requirements.

Thus, the Intelligent Communications Management System has access to a wealth of information, such as mission environment and internal state of the node, and uses this information in its decision making. The environment represents the systems knowledge about the outside world, including network and link performance, other nodes in the network environment, dynamic threats, terrain, obstacles and weather data. The internal state is a representation of the internals of the system. It collects internal data from contributing sub-systems, such as real-time node attitude and position, current operational mode and applications' communications requirements, and it retains communications/information exchange plans, policies and information about installed resources (e.g. communications links, antennas).

A database (not shown) provides the intelligent communications management module 10 with knowledge about its mission environment and internal state, and stores data policies and plans. The environmental data represents the system's knowledge about the outside world, including network and link performance, other nodes in the network environment, dynamic threats, terrain, obstacles and weather data. The internal state is a representation of the internal sub-systems of the system. The database collects internal data from contributing sub-systems, such as real-time node attitude and position, current operational mode and the communications requirements of individual applications, and it retains communications/information exchange plans, policies and information about installed resources (e.g. communication systems, antennas, etc). For example, an antenna performance model (i.e. antenna gain patterns) would be stored for each node to be used by the intelligent management module 10 in respect of, for example, antenna selection. In this example, the antenna gain patterns are mapped with respect to the body reference frame of the node, i.e. location of the antenna on the node.

It will be appreciated that the term "database" used above, is used simply to define one or more repositories for the required data. In one exemplary embodiment, the database may be a single repository, provided on the intelligent management module 10 (or at least dedicated thereto) in which all of the aforementioned data is stored for use thereby. In other exemplary embodiments, such a single repository may be used to store only a sub-set of the data, such as policies and installed antenna performance, to be accessed as required, with data that changes dynamically during a flight or mission, such as node position and operational mode, being sent directly from a relevant part of the overall platform management system to the intelligent communications management module.

Also illustrated in FIG. 1, are data inputs representative of constraints 24, platform demands, and policy 28. These factors and the manner in which data representative thereof can be obtained will be known to a person skilled in the art. The policy 28, for example, may be designed by the network designer. A copy of this policy may reside within the intelligent management module 10, or accessible thereby. The policy contains a set of rules that, for example, define how links and antennas can be used, what action to take in the event of a hardware fault and/or loss of signal, and how avionics applications can be served to support the mission. Such rules may be expressed as condition-action pairs (i.e. IF condition THEN action) and/or in look-up tables.

Figure 2:
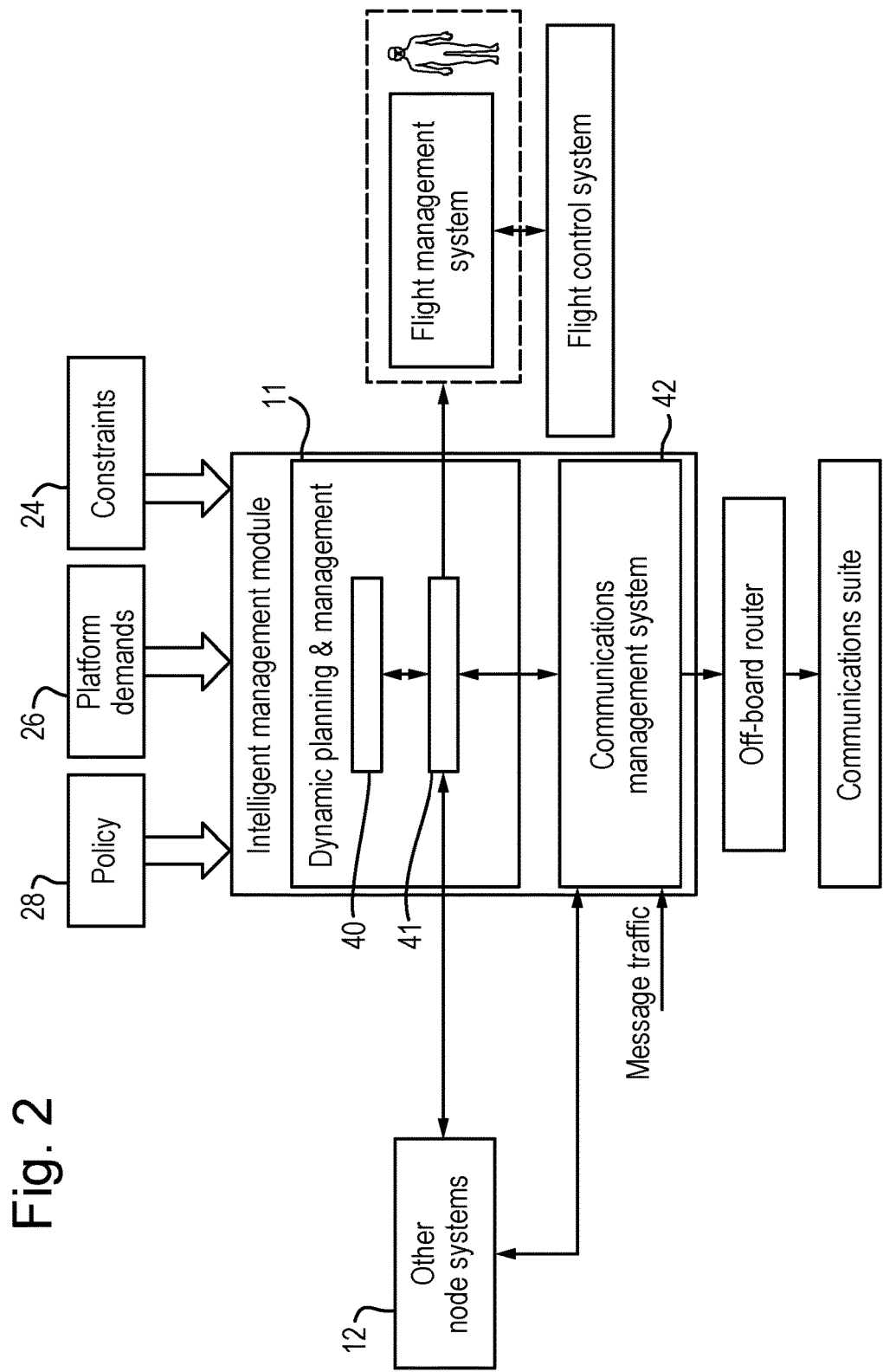
FIG. 2 is a schematic block diagram illustrating some principal features of the moving platform management system of FIG. 1 in more detail.

Thus, the Intelligent Communications Management System can be divided into two distinct parts with inputs and outputs to each other and other parts of the aircraft or ground-based system, as shown in FIG. 2. In another implementation, the different functions may reside in one box; this implementation may be appropriate for manned systems, such as a manned air vehicle.

EMCON or 'emission control' policies and strategies are used to prevent detection, identification and location of a moving platform, and/or minimise interference among the node systems of the moving platform. Whilst EMCON conditions (and, therefore policies and strategies for implementing them) vary, according to the application as well as particular circumstances, the underlying principles of EMCON will be well known to a person skilled in the art. Setting EMCON requires four basic steps: criteria, objectives, notification and authority. The criteria specify the overarching planning, procedure and responsibility for EMCON policy or strategy. The objectives, as will be apparent, define the desired result of the EMCON policy or strategy and may include, for example, minimising detection by third party sensors, allowing effective command and control (C2) communications between nodes, supporting operational deception (OPDEC), supporting operations security (OPSEC), minimising interference among nodes, and degrading effectiveness of third party C2 communications. It is these objectives that may be used by a communications planning module according to an exemplary embodiment of the present invention (in addition to node position/orientation and antenna type) to determine the suitability of an antenna for a particular information exchange when EMCON restrictions prevail, and/or the communication mode (e.g. output power) that can be used for a selected antenna to support that information exchange.

For completeness, the notification criterion specifies the parties to be notified of the EMCON policy or strategy, and the manner in which the criteria will be notified and monitored. Finally, authority defines the party or parties authorised to impose an EMCON condition in any particular case.

Referring now to FIG. 2 of the drawings, the intelligent management module 10 comprises a dynamic planning and management module 11 and a communications management system 42. The communications management system 42 is concerned with low-level decision making. When it is unable to resolve certain communications issues, then higher-level planning is invoked, i.e. it is configured to generate a plan request to the Dynamic Planning and Management unit (i.e. higher-level planning) in order to maintain adequate communications. In this case, a plan is generated for resolving communication issues, taking into account, not only prevailing situational and/or environmental conditions (including platform position/orientation, etc.) but also prevailing EMCON policy or strategy with respect to those conditions. A plan in this context may, for example, consist of data representative of a selected antenna together with power control data configured to control the power emissions from the selected antenna, to maintain communications without violating emission control criteria. In an alternative exemplary embodiment, the plan may consist of data representative of a selected antenna together with a node manoeuvre, in order to maintain communications. In yet another alternative exemplary embodiment, the plan involves the use of a sensor system's (e.g. RADAR) antenna or aperture antenna. In some cases, authorisation from the vehicle's decision maker will be required, especially if it involves changes to the platform behaviour (e.g. node manoeuvre) or the use of another system's resources (e.g. sensor system's antenna).

In the example shown, the dynamic planning and management module 11 comprises a dynamic planner 40 and a manager 41, that provides an interface between the dynamic planner 40 and the communications management system 42, as will be described in more detail below.

In exemplary embodiments of the present invention, at least parts 12 of the rest of the aircraft are communicably coupled to the communications management system 42 and the intelligent communications management system 10 works cooperatively with the rest of the node functional components/sub-systems to achieve the mission goal: to provide information for situational awareness and safety purposes, and to receive information used in its decision making.

The intelligent communications management system 10 receives a large quantity of information from different parts of the platform, which it can use in its decision-making processes, as described in more detail below. It is consequently mission-, motion-, and network-aware and understands what resources it has to manage, as well as their performance capability. Mission-awareness provides information on what the platform is trying to achieve. There can be various operational modes, that might include normal operation, reconnaissance, under attack, attack, taxiing, landing, etc. This is common to the entire platform and is of particular concern to the communications module 42. The communications module 42 monitors and evaluates current network performance, so it is network-aware. Network awareness information may also be shared with the dynamic planning and management 11 for planning purposes. Motion-awareness enables communications module 42 to intelligently route information along the best path to ensure connectivity to a fixed and/or mobile node is maintained, for example, in response to an unexpected and possibly a sharp manoeuvre. The dynamic planning and management 11 is also motion-aware, in that it may receive a priori future route and/or manoeuvre plan in order to assess its impact on communications and to select suitable communications link(s), including antennas. The dynamic planning and management 11 is aware of other platform demands, such as emission demands. It is thus, mission-, network-, motion- and platform-aware, enabling the intelligent communications management system 10 to dynamically adapt and respond to unexpected events, e.g. change in mission priorities, mission environment and network conditions.

Referring back to FIG. 2 of the drawings, dynamic planners are also widely known and used in many different applications. A dynamic planner is typically provided in respect of, for example, a UAV for planning its route/path, from a start point (typically, but not always) to a defined end point (and optionally including any defined waypoints therebetween), as well as planning its manoeuvre and/or trajectory. Known dynamic planners (path, manoeuvre and trajectory) tend to base their calculation on several factors, such as terrain, threat, weather, and platform constraints. For example, a manoeuvre may be calculated to avoid an airborne obstacle or a path calculated to avoid detection of the UAV. Other types of dynamic planners for route planning in many different applications will be known to a person skilled in the art and the present invention is not necessarily intended to be limited in this regard. However, in prior art systems, the need to perform dynamic communications management in respect of a platform movement and/or as part of platform protection to avoid detection (in the case of EMCON), has not been considered.

In this exemplary embodiment of the present invention, the management function 41 of the dynamic planning and management module 11 may be configured to interface with the dynamic planner 40, the communications management system 42 (for example, via a communications executive, as will be described in more detail below) and other parts of the node system 12. In this case, the management function 41 may be responsible for generating plan requests and providing attributes to the dynamic planner 40, evaluating new plans, selecting the best plan, requesting authorisation from the platform/pilot to execute the new plan (e.g. use a sensor system for communication purposes, manoeuvre a node), in order to optimise communications.

In the following method, according to an exemplary embodiment of the present invention, for the selection of antennas in aircraft (or other moving platform) communications systems is described in more detail. It will be appreciated that antenna selection methods according to various exemplary embodiments of the present invention, can exist in their own right, be part of a planning element, or be part of another system, such as message routeing, and the present invention is not necessarily intended to be in any way limited in this regard.

Figure 3:
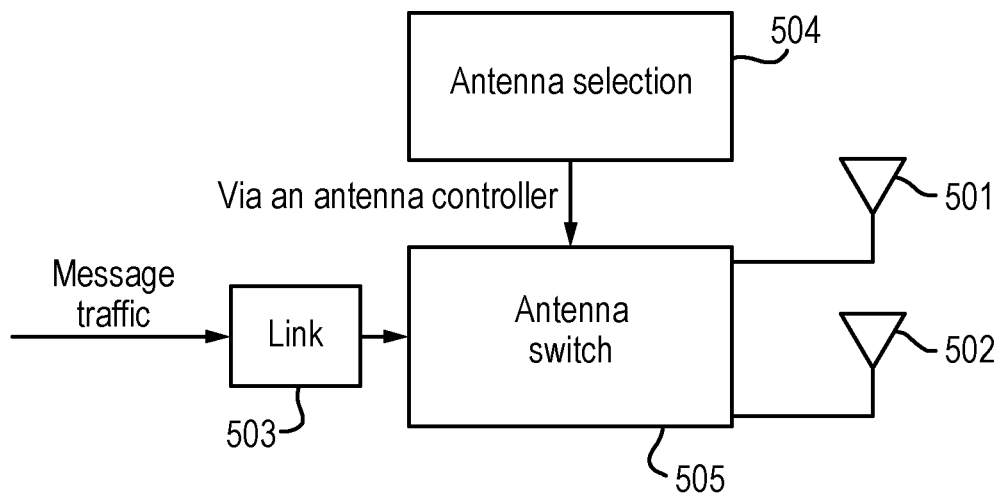
FIG. 3 is a schematic block diagram illustrating an exemplary implementation of antenna selection incorporating apparatus according to an exemplary embodiment of the present invention.

Referring to FIG. 3 of the drawings, a node/platform has a communications link with two antennas 501, 502 that can be used to support a wireless data link 503 for information exchange with another node. For example, one antenna 501 may have a different gain pattern to the other antenna 502 (e.g. omni-directional and directional antennas), or both antennas 501, 502 may have the same gain pattern but be mounted at different locations on the node. In this case, an antenna selection method according to an exemplary embodiment of the invention (depicted at 504) evaluates each of the antennas 501, 502 and selects the antenna determined to offer the best performance (including emissions control constraints). The selection is passed onto an antenna controller (not shown) for execution. For example, the antenna controller interfaces between an antenna selection unit 504 and an antenna switch 505 (e.g. low level controls). Upon receiving the selected antenna choice from the antenna selection unit 504, it sends lower-level control commands to execute the selection to either one or other of the antennas 501, 502. The antenna controller is aware of the success or failure of the action carried out to implement the selection and, in the event of a failure, the controller is configured to report the failure to the antenna selection unit 504 for alternate or remedial action.

Figure 4:
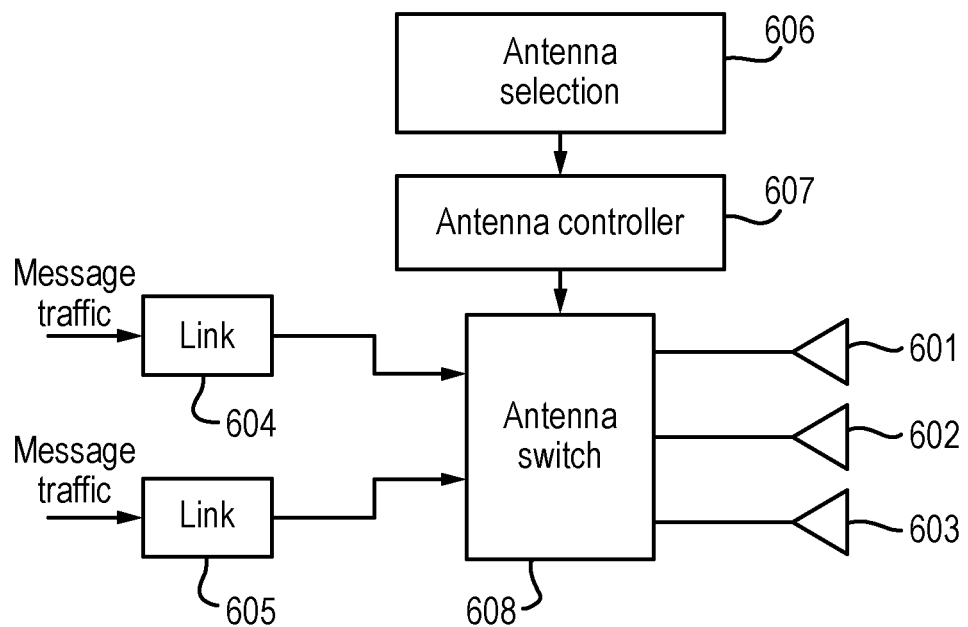
FIG. 4 is a schematic block diagram illustrating an exemplary implementation of antenna selection incorporating apparatus according to an exemplary embodiment of the present invention.

Referring to FIG. 4 of the drawings, the antennas 601, 602, 603 may be shared between various communications links 604, 605, or with sensor systems. The antenna selection method (depicted at 606) according to an exemplary embodiment of the present invention evaluates each of the antennas 601, 602, 603 and then selects the antenna determined to offer the best performance (includes adherence to emissions control) for a given communications link 604, 605. Once again, data representative of the selected antenna is sent from the antenna selection unit 606, via an antenna controller 607 to an antenna switch 608, for example, to couple a specified link to the selected antenna.

Figure 5:
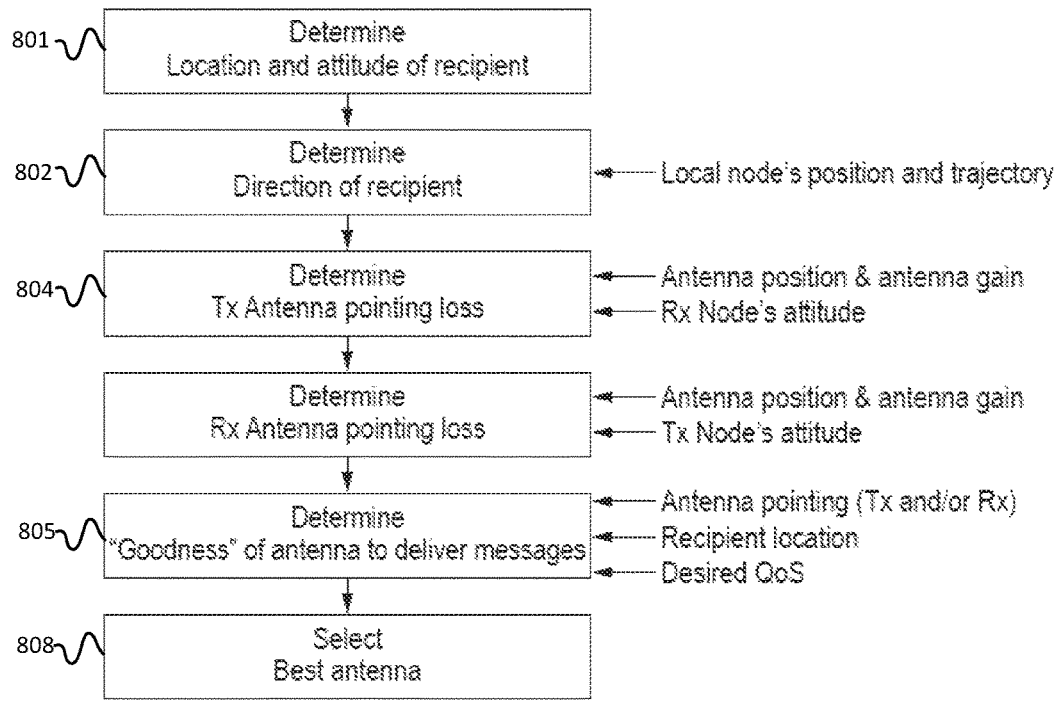
FIG. 5 is a schematic block diagram illustrating an exemplary implementation of antenna selection incorporating apparatus according to an exemplary embodiment of the present invention.

One or more communications links may also share an aperture antenna with other systems (such as RADAR, ESM and Navigation), wherein the shared antenna (also known as a shared aperture antenna) is composed of multiple portions. Referring to FIG. 5 of the drawings, the multiple portions of an aperture antenna may be shared between various communications links, and/or with other systems (e.g. sensor). The antenna selection method according to an exemplary embodiment of the present invention evaluates each of the portions of the aperture antenna and then selects the portion of the antenna determined to offer the best performance (includes adherence to emissions control) for a given communications link. Once again, data representative of the selected antenna is sent from the antenna selection unit 606, via an antenna controller for implementation, in order to couple a specified link to the selected antenna. Furthermore, for a selected portion of an aperture antenna pertaining to a sensor (e.g. RADAR), this may require authorisation from the platform decision maker regarding the use of this antenna before use.

Evaluation of the antennas, and selection of the 'best' antenna, may be performed on the basis of the current position, attitude and/or velocity of the node(s) and it may include predicted future values thereof. In other exemplary embodiments, evaluation of the antennas, and subsequent selection, may be based on a priori known values, such as manoeuvre, trajectory, position and attitude of node(s) (based on a manoeuvre and/or trajectory plan calculated by the dynamic planner, or otherwise). This method, once again, evaluates the antennas based on node position, node attitude and the (known) antenna gain characteristics of the various antennas on the node to dynamically select which of the various antennas to use to communicate with the recipient node or with a source node. The antenna with the best performance is selected for the communications link and the selection is passed to the antenna controller for execution.

Figure 6:
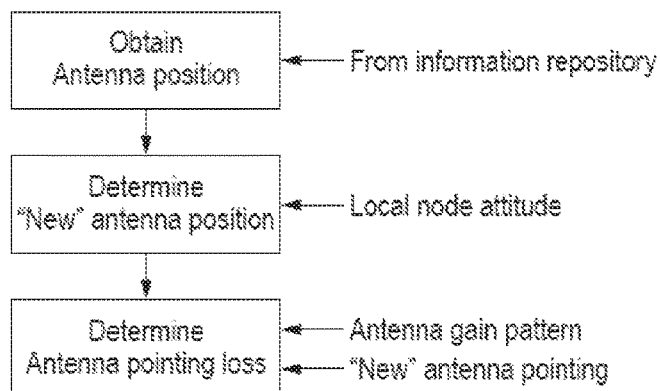
FIG. 6 is a schematic block diagram of an antenna analysis and selection module according to an exemplary embodiment of the present invention.

Referring to FIG. 6, the antenna selection module comprises an antenna analysis function and antenna selection function. An antenna analysis function determines the suitability of one or more antennas, or shared aperture antennas, to be used for either transmission or reception of messages; and an antenna selection function then selects the 'best' antenna(s) to route a message. The antenna analysis is based on a plurality of factors, such as antenna availability, antenna compatibility, antenna preferences, antenna pointing, location and performance, estimated and/or measured network performance, platform movement, EMCON, operational mode, policy and communications requirements for platform application. Antenna Availability represents whether an antenna is available for communications e.g. in good working order or not. Antenna Preference represents the preference of using an antenna for communications. For example, the preference for using a communications antenna is assigned a 10-value, while the preference for using a RADAR antenna is assigned a 5-value. Antenna Compatibility determines whether the antenna can support the waveform needed to transmit or receive a signal (e.g. cannot use a 5 GHz antenna to transmit or receive a signal operating at 1 GHz). The antenna availability, antenna compatibility and antenna preference can be determined using a look-up table.

Figure 7:
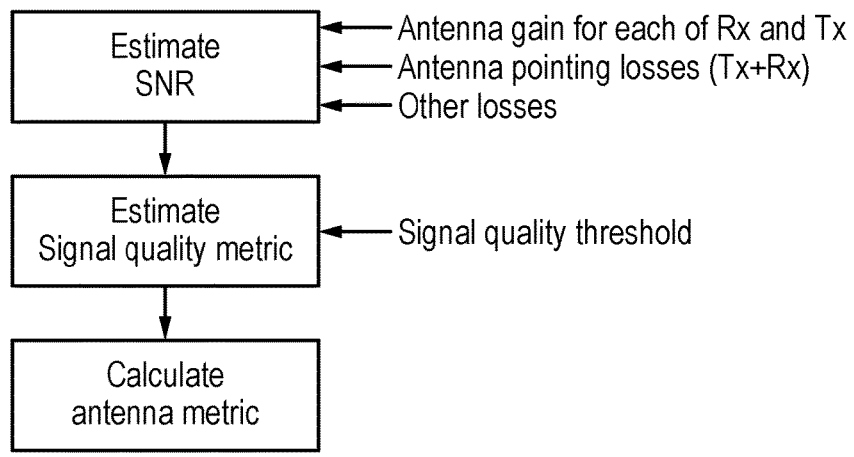
FIG. 7 is a flow chart illustrating the principal steps in an antenna selection method according to an exemplary embodiment of the present invention.

Referring to FIG. 7 of the drawings, a flow chart is provided, which illustrates a method of one embodiment of antenna selection, namely the selection of a transmitting antenna (or portion of an aperture antenna). To select a receiving antenna, a similar method, as that illustrated in FIG. 7, can be followed. In the illustrated method, node movement at the source and/or destination is considered (it is noted here that the recipient node may be a fixed or mobile node. For example, the recipient node could be a fixed ground station, or it could be a mobile, airborne or ground node, or even a satellite). The method begins by determining, at step 801, the position and/or attitude of the recipient node. In one exemplary embodiment, the position and attitude of other nodes can be obtained via in-mission updates, with which a person skilled in the art will be familiar. For example, the node broadcasts its own position and heading. In another exemplary embodiment, the position of a fixed node is determined by accessing the database. In another exemplary embodiment, the position of the mobile node is predicted based on past trajectory and heading data, for example (shared via broadcasts). In yet another exemplary embodiment, location and attitude can be inferred from previously received messages from a node.

At step 802, the method proceeds with the determination of the direction of the recipient node with respect to the source node. In an exemplary embodiment, this method step comprises calculating a vector based on the position of the two nodes, wherein the source node could, in accordance with one exemplary embodiment, could be provided by satellite data for example.

At step 804, the method proceeds with determining the antenna pointing loss with respect to the transmitting node and then proceeds with determining the antenna pointing loss with respect to the receiver. The antenna pointing loss, for either a transmitter or receiver antenna, is a function of antenna position, antenna gain (at source or recipient) and node attitude.

The antenna position can be described as the physical location of the antenna (e.g. in terms of attitude) on a node and the antenna pointing. The antenna position attributes are accessed via a database. It will be apparent to a person skilled in the art, a "new" antenna position (i.e. "new" mount and "new" pointing) is determined as a function of "stored" antenna position, node attitude and node position (e.g. longitude, latitude, altitude). The "new" antenna pointing is then used to determine the antenna pointing loss (i.e. the loss due to node manoeuvre) from the antenna gain pattern.

At step 805, the method determines the suitability (i.e. the "goodness") of the antenna to support the required communications link, i.e. by estimating the quality of the communications link if a particular antenna is used. The estimate considers the effect of node manoeuvre on the quality of the link, in terms of antenna pointing loss(es) (from the previous step) and considers other loss factors, such as free-space propagation loss and atmospheric loss.

Figure 8:
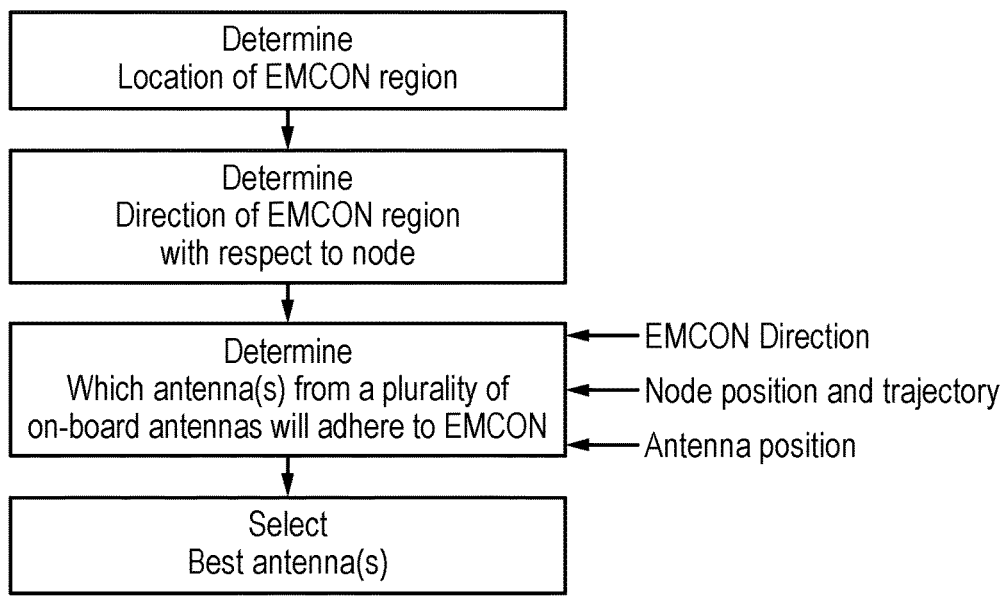
FIG. 8 is a flow chart illustrating the principal steps of an exemplary implementation of antenna "goodness" function for use in a method according to an exemplary embodiment of the present invention.

Referring to FIG. 8 of the drawings, a flow chart is provided to illustrate an implementation of an antenna "goodness" function that may be used, and the following exemplary method describes how the suitability of the antenna for communications may be determined.

The method starts with estimating the SNR of the communication links for a given antenna. The SNR is estimated in order to determine the impact of node manoeuvre on the signal quality. The SNR estimation includes the antenna pointing losses, free-space propagation loss, and the gains for transmitting and receiving antennas. Additional losses can also be considered e.g. atmospheric loss. The calculation can be based on Friis Transmission formula.

The method proceeds with calculating a signal quality metric for a given antenna. The metric can be based on the estimated SNR against a pre-defined threshold. The metric may have a value between 0 and 1.

The method proceeds with calculating the Antenna Metric. In one embodiment, the antenna metric may have a value between 0 and 10, for example. This metric can also be based on the estimated signal quality and Antenna Availability and/or Antenna Compatibility and/or Antenna Preference.

In another embodiment, the link quality for a given antenna may also be determined, in terms of throughput and latency. In which case, link quality is based on the estimated SNR. For example, throughput can be calculated by using Shannon's theorem, $C=W \log_2(1+SNR)$. The Antenna Metric can then be based on the estimated link quality and Antenna Availability.

Referring back to FIG. 7, at the next step 808, the best antenna from amongst a plurality of on-board antennas is selected either to transmit information to the recipient node or to receive information from a source node. The method may also be configured to select more than one "best" antenna to transmit the same message, for example for network redundancy implementations. The selection is based on the antenna with the highest metric.

Thus, the above-described method has, for simplicity, been provided to illustrate generally the concept of antenna selection based on node manoeuvre attributes, when no EMCON conditions are imposed. In exemplary embodiments of the present invention, the method is expanded to provide a method of antenna selection in moving platform (e.g. aircraft) communications systems, when the communications system has been informed that the respective node is required to operate under EMCON conditions.

Referring to FIG. 8 of the drawings, the illustrated flow chart demonstrates the process of antenna analysis and selection whilst considering emissions control for a given antenna. The aim is determine whether the use of a transmitting antenna will expose the platform i.e. violate emissions control. Thus, the antenna analysis function receives data representative of the location or position and attitude of the EMCON region (e.g. from another platform system); then for each antenna, it determines whether the antenna is pointing in the direction of the EMCON region (based on its understanding of where it's antenna is physically located on the node and pointing, and node position and location); if so, it determines whether a hypothetical transmission will violate EMCON; based on the analysis it determines the "goodness" of the antenna to adhere to EMCON, and finally selects the best antenna or antennas to use from a plurality of on-board antennas.

A method according to an exemplary embodiment of the present invention begins with determining the location of the emissions control region, wherein a fixed adversary resides. This information can be obtained via dynamic in-mission updates, or by accessing a database. The emissions control region can be defined in terms of longitude, latitude, and altitude. In another embodiment, the method determines the position of the emissions control region for a known mobile adversary, as well as other attributes, such as attitude of the adversary.

The method proceeds with determining the direction of the EMCON region with respect to the node. In one embodiment, the position of the node is provided by satellite data. The position of the EMCON region is determined in the previous step.

The method proceeds with determining whether an antenna will adhere to emissions control or not, with respect to the defined EMCON region. An Antenna Metric is calculated to determine how good or bad the antenna is. The metric considers the (new) antenna pointing, antenna radiation pattern (in terms of mainlobe, sidelobes and beamwidth), the location of the EMCON region and the signal quality, in terms of SNR, in the direction of the EMCON region. Signal quality varies with distance between two points, decreasing in value as the distance increases. At a particular distance between the two points, the signal is low enough that it becomes undetectable. Hence, a given antenna could be pointing towards the EMCON region (fixed or mobile adversary), but its emission at certain distance from the node is below a SNR threshold. In which case, there is no EMCON violation. Hence this step determines whether an antenna will adhere to emissions control. The antenna pointing vector (i.e. in what direction is the antenna pointing) is determined by considering the antenna position, node attitude and node position.

An exemplary method that can be used to calculate the antenna metric is illustrated schematically in FIG. 9 of the drawings, and will be described later.

Thus, referring back to FIG. 8, the method proceeds with selecting the best antenna or antennas from among a plurality of on-board antennas for use while operating under emissions control. Note: the selection does not mean that the antenna will be suitable to route a message in an expedient fashion to the destination, for example in terms of throughput or latency. The path from the node to the recipient will need to be assessed in terms of link and network performance, and the application's communications requirements in order to deliver a message.

Figure 9:
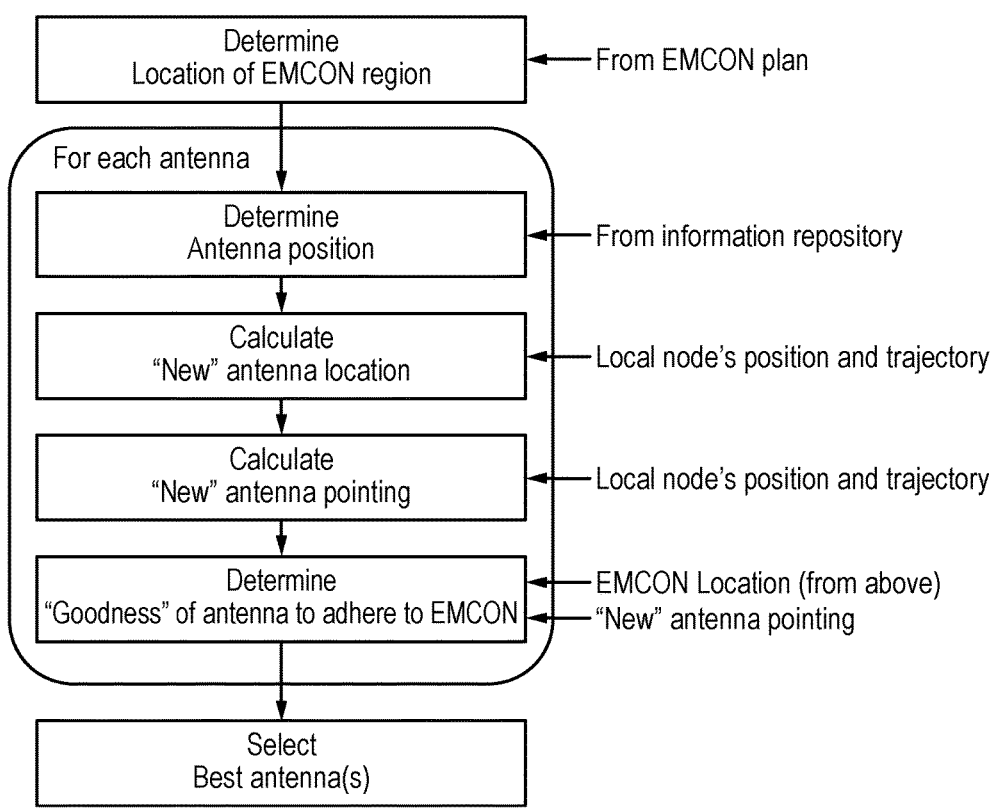
FIG. 9 is a flow chart illustrating the principal steps in a method for determining an antenna metric for use in apparatus according to an exemplary embodiment of the present invention.

Referring to FIG. 9 of the drawings, there is provided a flow chart which is illustrative of the principal steps that may be performed in the implementation of an exemplary antenna "goodness" function, as described above.

The illustrated method describes how the suitability of an antenna for communications is determined while operating under EMCON or avoiding to be heard by an adversary.

The first step starts by determining whether the antenna is pointing in the direction of the EMCON region (fixed or mobile adversary). This is based on the antenna pointing vector, antenna radiation pattern and the location of the EMCON region or adversary with respect to the node. A binary 1 or 0 may be used to represent whether the antenna is pointing in the direction of the EMCON region or adversary node, or not.

The next step estimates a signal quality, such as the SNR, at a given distance from the node in the direction of the EMCON region. For example, the distance can be defined as the distance from the node to the start of the EMCON region, or the distance from the node to a pre-defined distance before the EMCON region (e.g. 1 Nautical Mile before EMCON region begins). The Friis Transmission equation may, for example, be used to estimate the SNR, but other appropriate equations will be apparent to a person skilled in the art.

The method proceeds by determining a SNR Metric based on the estimated SNR to determine if the SNR will violate EMCON or not. The SNR Metric can be a value in the range of 0 and 1. In one embodiment, a look-up table can then be used to map the SNR metric directly to two QoS states of high SNR and low SNR.

The final step calculates an Antenna Metric. The Antenna Metric can be based on the SNR Metric.

In one embodiment, the antenna selection approach uses a priori knowledge regarding the aircraft's future flight trajectory and/or route to select appropriate antenna. For example, in one embodiment, the antenna selection approach is coupled to the aircraft's route planner or mission management system, which plans the flight path for the aircraft. The trajectory and/or route plan is received by the Antenna Selection unit a priori; antenna selection chooses the best antenna or best antennas for the aircraft over some future interval of time.

In some exemplary embodiments of the present invention, the antenna selection approach may use a priori knowledge regarding the aircraft's future flight manoeuvre (e.g. heading) to select appropriate antenna. For example, in one embodiment, the antenna selection approach is coupled to aircraft's dynamic manoeuvre planner, which plans the heading the aircraft will take. A manoeuvre plan is received a priori; antenna selection chooses the best antenna for the aircraft over some future interval of time. One example of a manoeuvre plan is a sense and avoid plan for avoiding obstacles.

In another exemplary embodiment, the antenna selection method may use instant knowledge regarding the aircraft's current manoeuvre (e.g. heading, banking) to select appropriate antenna. In one embodiment, the antenna selection approach is coupled to the vehicle control system or other system to receive current attributes, such as position and attitude that the aircraft is undertaking.

In yet another exemplary implementation, the antenna selection method uses current knowledge and future calculations to determine the best antenna to use. The future calculation can be based on predicted or a priori knowledge of future node movement (e.g. trajectory, manoeuvre and route) and attitude. As an example, based on the current attributes an antenna is good enough to use, but in the future it will no longer be suitable. For example, at some time in the future (e.g. over the next 2 minutes travel time) the antenna will no longer adhere to emissions control, because the distance between the "good" node and (fixed or mobile) adversary node is decreasing as a function of time. In another example, in the future (e.g. over the next 3 minutes travel time) the antenna will not be optimally orientated with respect to another. As a result, the antenna is given a low metric (i.e. not suitable). As such, the antenna metric comprises of a current metric and one or more future metrics, based on predicted or a priori known attributes, such as trajectory and attitude.

In some exemplary embodiments of the present invention, for a shared aperture antenna, the abovementioned can be used to evaluate portions of the aperture antenna and select the portion of aperture antenna determined to offer the best performance (includes adherence to emissions control) for a given communications link.

In some exemplary embodiments, the antenna selection result may be accompanied by an additional plan element for enabling the antenna selection to be performed adequately, whilst adhering to prevailing EMCON conditions. Thus, in one exemplary embodiment, antenna selection combined with a node manoeuvre may be required to maintain adequate communications without violating emissions control. In other exemplary embodiments, antenna selection is combined with power control to maintain adequate communications without violating emissions control.

Figure 10:
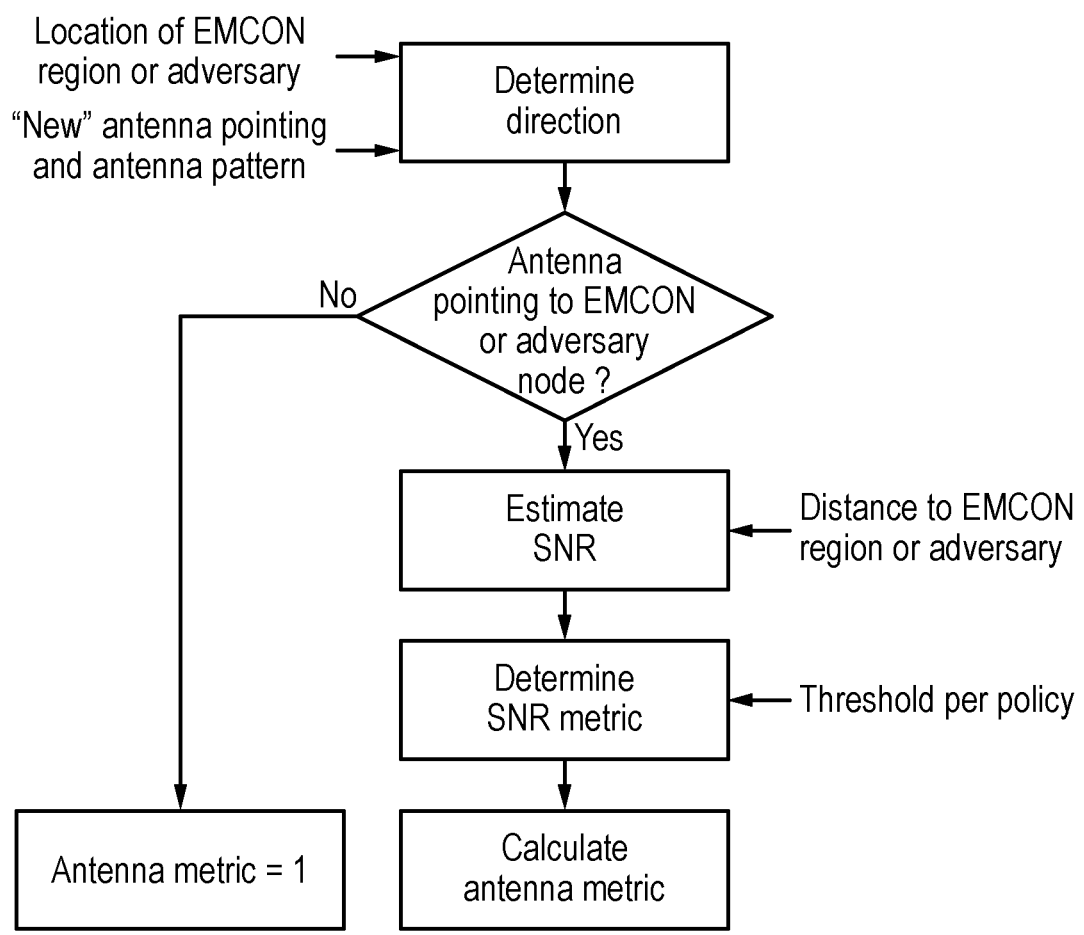
FIGS. 10, 11 and 12 illustrate schematically some specific circumstances in which exemplary embodiments of the present invention may be employed.

Examples of embodiments of the present invention, when in use, will now be described with reference to FIGS. 10, 11 and 12 of the drawings. Thus, referring to FIG. 10 of the drawings, an aircraft 130 can be seen using its left-hand antenna for transmission to a recipient node 132 along its flight path. As the aircraft 130 manoeuvres, the left-side antenna is no longer pointing in the direction of the recipient 132. Instead, the antenna selection method described above, having determined that there are no prevailing EMCON restrictions operating, causes the antenna at the front of the aircraft 130, which has line-of-sight with the recipient 132, to be selected and used to maintain the link with the recipient 132. The recipient 132 may be a fixed or mobile node.

Figure 11:
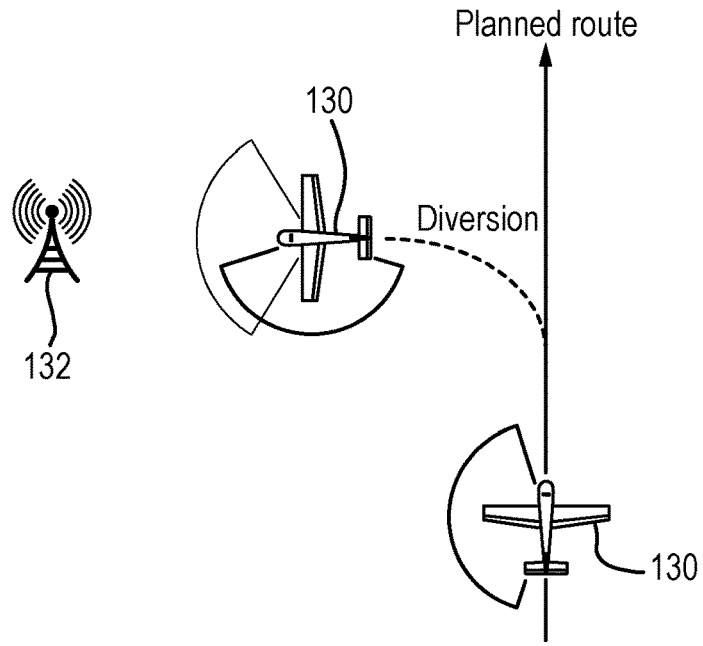

Referring to FIG. 11 of the drawings, an aircraft 230 having a directional transmission antenna pattern 232 to its right-hand side and an additional omni-directional transmission pattern 234 is illustrated schematically. On its planned flight path, it communicates with another node using the omni-directional antenna. On course, dynamic emissions control is imposed in-flight in respect of the top-left quadrant 236. It will be appreciated that the omni-directional antenna is now pointing in the direction of a prohibited region and the energy radiation from the antenna is significant to violate the emissions control. Thus, the apparatus of the present invention is triggered to cause the directional transmission antenna mounted on the right-hand side of the aircraft 230 to be used instead so as to maintain a link with the recipient node 238, whilst adhering to emissions control. If the recipient node 238 had been located to the bottom right hand quadrant, then antenna selection and a node manoeuvre plan (as mentioned above) would be required to establish the required link whilst adhering to EMCON; a node manoeuvre plan changes the orientation of the aircraft 230 so as to place the directional antenna at a position and orientation that would enable it to establish the required link with the recipient node 238.

Figure 12:
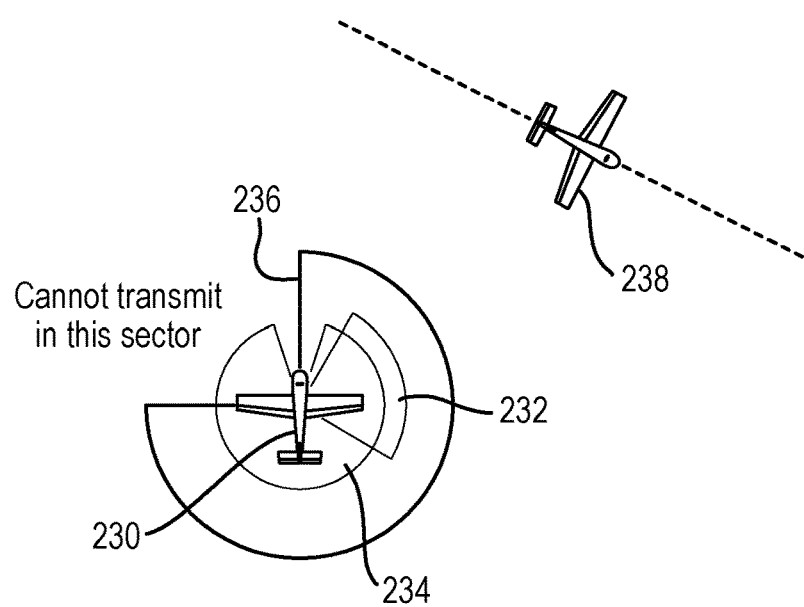

Referring to FIG. 12 of the drawings, an aircraft 130 can be seen using its left-hand antenna for reception from a transmitting node 132 along its flight path. As the aircraft 130 manoeuvres, the left-side antenna is no longer pointing in the direction of the source/transmitting node 132. Instead, the antenna selection method described above, causes the antenna at the back/on the tail of the aircraft 130, which has line-of-sight with the transmitting node 132, to be selected in order to maintain communications. The transmitting node 132 may be a fixed or a mobile node.

It will be apparent to a person skilled in the art, from the foregoing description, that modifications and variations can be made to the described embodiments without departing from the scope of the invention as defined by the appended claims.

The invention claimed is:

1. An apparatus for management of communications resources of a moving platform comprising:
   a communications system configured to effect wireless data communication between said moving platform and a recipient node, said communications resources comprising a plurality of wireless communications links for facilitating said wireless data communication and a plurality of antennas associated therewith; and
   an antenna analysis and selection module residing within said communications system and configured to:
   identify a communications requirement between said moving platform and the recipient node;
   receive attribute data representative of movement of said platform, said attribute data including platform movement data comprising future known movement of said moving platform and/or future predicted movement of said moving platform and/or said recipient node;
   determine, using said attribute data, suitability of each of the plurality of antennas and/or portions of aperture antenna for data transmission from said moving platform to said recipient node;
   determine a quality metric for each of the plurality of antennas/portions of aperture antenna, said quality metric being indicative of a respective performance criterion, wherein said quality metric is representative of an antenna gain characteristic of a respective antenna, based on moving platform position and/or attitude; and
   select one or more of suitable antennas and/or portions of aperture antenna having a highest performance criterion, for said data transmission.

2. The apparatus according to claim 1, configured to determine, by estimating a quality of a respective resultant communications link, said suitability of each of the plurality of antennas and/or portions of aperture antenna for data transmission from said moving platform to said recipient node.

3. The apparatus according to claim 1, wherein said attribute data includes data representative of emissions control criteria associated with said moving platform and/or said recipient node.

4. The apparatus according to claim 3, configured to determine said suitability of each of the plurality of antennas and/or portions of aperture antenna for data transmission from said moving platform to said recipient node by determining, for each of said plurality of antenna and/or portion of antenna aperture, whether or not data transmission thereby to said recipient node will adhere to said emissions control criteria.

5. The apparatus according to claim 1, configured to receive, during mission execution, platform movement data from a system/subsystem and/or function of said moving platform.

6. The apparatus according to claim 1, configured to receive, during mission execution, attribute data representative of emissions control restrictions.

7. The apparatus according to claim 1, wherein said platform movement data comprises position and/or attitude data associated with said moving platform and received from one or more systems/subsystems and/or functions of said moving platform.

8. The apparatus according to claim 7, wherein said attribute data includes route and/or manoeuvre and/or trajectory data.

9. The apparatus according to claim 5, wherein said attribute data includes data representative of emissions control criteria associated with said moving platform and/or said recipient node, the apparatus being configured to receive, during a mission from one or more systems/subsystems and/or functions of said moving platform, the attribute data representative of said emissions control criteria, said attribute data comprising (i) location data representative of a specified emissions control region, and/or (ii) position and/or attitude and/or velocity data representative of an adversary node defining an emissions control region.

10. The apparatus according to claim 1, wherein said attribute data includes data representative of current movement of said moving platform.

11. The apparatus according to claim 1, configured to obtain (i) data representative of a location of a fixed recipient node with respect to said moving platform, or (ii) data representative of position and/or attitude and/or velocity of a mobile recipient node with respect to said moving platform; and to:
   determine a direction of said moving platform relative to said fixed/mobile recipient node;
   determine an antenna pointing loss of each said antenna/portion of aperture antenna at said recipient node and/or said moving platform; and
   calculate a quality metric for each said antenna/portion of aperture antenna based on said pointing loss(es) or a performance metric based on said pointing loss.

12. The apparatus according to claim 1, wherein said quality metric is indicative of antenna availability and/or preference and/or compatibility.

13. The apparatus according to claim 1, wherein said attribute data includes data representative of emissions control criteria associated with said moving platform and/or said recipient node, configured to identify one or more suitable antennas or portions of aperture antenna from a plurality of antenna resources by (i) determining a location or position of an emissions control region; (ii) determining orientation of said moving platform relative to said emissions control region; (iii) obtaining modified antenna pointing data in respect of a specified antenna or portion of aperture antenna; (iv) determining if wireless data transmission via said specified antenna or portion of aperture antenna will violate said emissions control region; and calculating a quality metric for each said antenna or portion of aperture antenna of said moving platform relative to an emissions control region.

14. A method for management of communications resources of a moving platform comprising a communications system configured to effect wireless data communication between said moving platform and a recipient node, said communications resources comprising a plurality of wireless communications links for facilitating said wireless data communication and a plurality of antennas associated therewith, the method comprising using an antenna analysis and selection module residing with said communications system to:
   identify a communications requirement between said moving platform and said recipient node;
   receive attribute data representative of movement of said moving platform, said attribute data including platform movement data comprising future known movement of said moving platform and/or future predicted movement of said moving platform and/or said recipient node;

determine, using said attribute data, suitability of each of the plurality of antennas and/or portions of aperture antenna for data transmission from said moving platform to said recipient node, wherein said quality metric is representative of an antenna gain characteristic of a respective antenna, based on moving platform position and/or attitude;

determine a quality metric for each of the plurality of antennas/portions of aperture antenna, said quality metric being indicative of a respective performance criterion; and select one or more of said suitable antennas/portion of aperture antenna having a highest performance criterion, for said data transmission.

15. An apparatus for management of communications resources of a moving platform comprising:

a communications system configured to effect wireless data communication between said moving platform and a recipient node, said communications resources comprising a plurality of wireless communications links for facilitating said wireless data communication and a plurality of antennas associated therewith; and an antenna analysis and selection module residing within said communications system and configured to:

identify a communications requirement between said moving platform and the recipient node;

receive attribute data representative of movement of said platform, said attribute data including data representative of emissions control criteria associated with said moving platform and/or said recipient node and platform movement data comprising future known movement of said moving platform and/or future predicted movement of said moving platform and/or said recipient node;

determine, using said attribute data, suitability of each of the plurality of antennas and/or portions of aperture antenna for data transmission from said moving platform to said recipient node;

determine a quality metric for each of the plurality of antennas/portions of aperture antenna, said quality metric being indicative of a respective performance criterion; and select one or more of suitable antennas and/or portion of aperture antenna having a highest performance criterion, for said data transmission.

* * * * *